PORTLOCK & DODD.
Car Brake.
No. 83,661.
Patented Nov. 3, 1868.
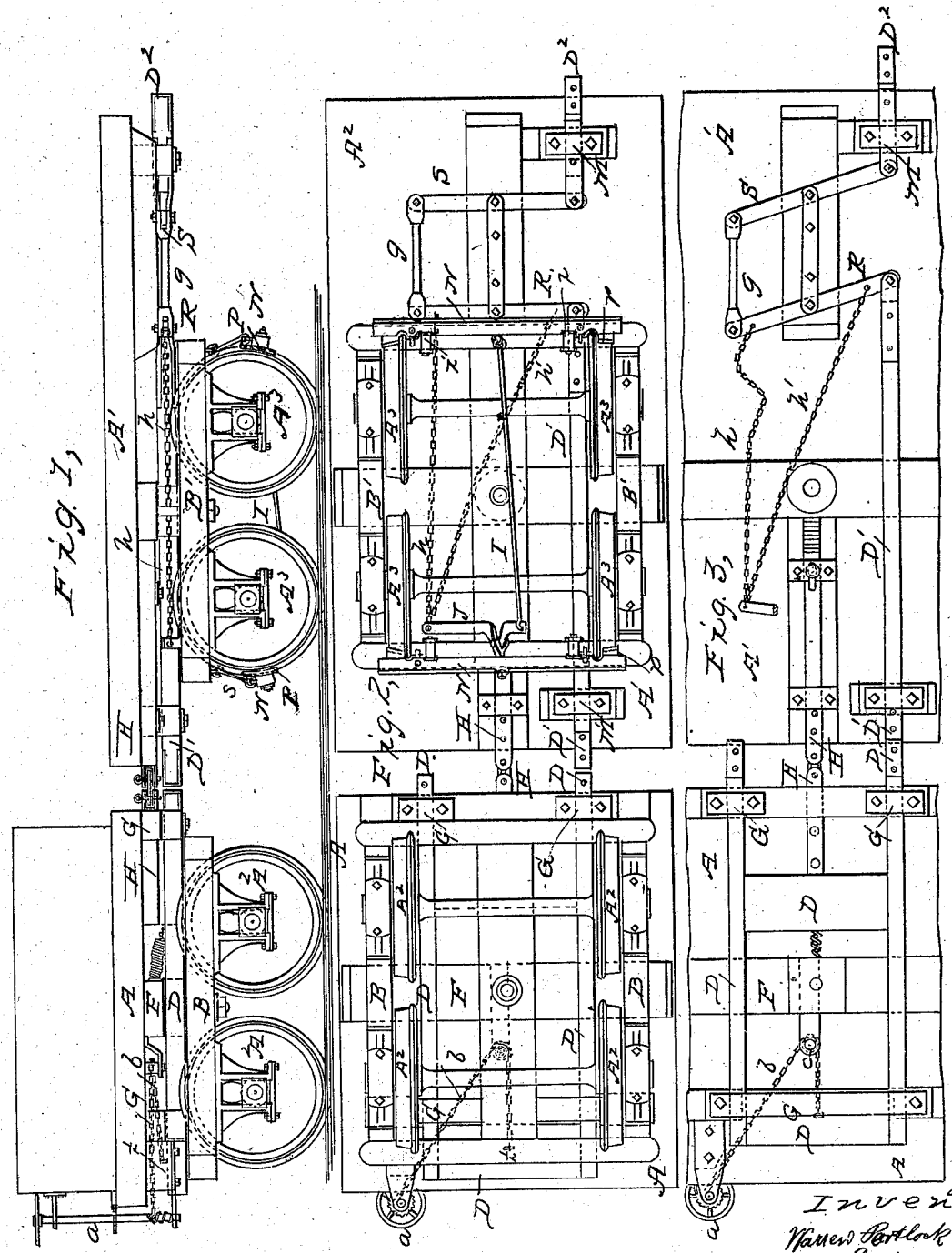

United States Patent Office.

WARREN PORTLOCK AND J. R. DODDS, OF NEW LONDON, IOWA.

Letters Patent No. 83,661, dated November 3, 1868.

IMPROVED RAILWAY-CAR BRAKE.

The Schedule referred to in these Letters Patent and making part of the same.

*To all whom it may concern:*

Be it known that we, WARREN PORTLOCK and J. R. DODDS, of New London, in the county of Henry, and State of Iowa, have invented a new and improved Method of Operating Railroad-Car Brakes; and we do hereby declare that the following is a full, clear, and exact description thereof, reference being had to the accompanying drawings, making a part of this specification, in which—

Figure 1 is an elevation of a locomotive-tender, coupled to a portion of the platform of a car, having applied to them our improved contrivances for operating the brakes.

Figure 2 is a bottom view of fig. 3, showing the relative positions of the brake-levers, when the brakes are released from the wheels.

Figure 3 is a view in detail, showing the relative positions of the brake-levers, when the brakes are applied to the wheels.

Similar letters of reference indicate corresponding parts in the several figures.

This invention relates to certain novel improvements, which are applicable to railroad-car brakes, and designed for placing the brakes of a car, or train of cars, under control of the engineer, while stationed at his post, and enabling him to apply the brakes to the wheels of each car in a train, and to release all the brakes at pleasure.

The nature of our invention consists in a novel manner of applying, to the body of a tender of a locomotive-engine, a longitudinal-sliding frame, which is pressed forward by a spring, or its equivalent, and which is provided with devices, whereby it can be forcibly moved backward by hand, in the employment, in conjunction with such frame, of a system of levers, connecting-rods, and chains, arranged beneath the cars, and so connected to the brake-rods of each truck-frame of a car that the engineer can, at his pleasure, apply all the brakes throughout a train of cars or coaches, or release the brakes from their wheels, whenever it is desired to stop or start the train, as will be hereinafter explained.

To enable others skilled in the art to understand our invention, we will describe its construction and operation.

The accompanying drawings represent the truck and bed of a locomotive-tender, and one truck and a portion of the bed of a car coupled to the bed of said tender. Beneath the bed A of the tender, and arranged to slide longitudinally in suitable guides, G G, is a frame, D, which consists of two longitudinal beams or bars, of equal length, secured together by means of transverse beams or bars, and properly braced, so as to form a substantial sliding frame, the rear ends of which extend short distances beyond the rear end of the platform A, as shown in figs. 1, 2, and 3.

This sliding frame is designed to afford a means whereby power can be transmitted from a turning-brake shaft, $a$, or its equivalent, to the devices which actuate the brakes.

The vertical brake-shaft $a$ is located so as to be convenient to the engineer, when stationed at his post, and to the lower end of this shaft a chain, $b$, is attached, which passes backward and around a drum or pulley, $c$, and thence extends forward, and is secured to the front cross-beam of the sliding frame D, as shown in figs. 2 and 3. By turning the brake-shaft $a$, and winding the chain upon it, the frame D will be forcibly moved backward. When the brake-rod is released from a pawl, or other suitable retaining-catch, a spring $e$, or its equivalent, will move the frame D forward. The brake-shaft $a$, shown in the drawings, is constructed like the well-known hand-brake rods, commonly used at the ends of railroad-cars, to apply and release brakes, and such rod is represented, in connection with our improved contrivances, to enable us to explain the mode of forcing back the sliding frame.

In rear of the tender, and connected to it by suitable couplings, H H, is a railroad passenger or freight-car, such portions of which are represented in the drawings as will enable us to explain the construction and application of our improved system of brake-actuating devices.

$A^1$ represents the bed of car, and $B'$ $A^3$ one of its trucks, which parts are or may be constructed in the usual well-known manner.

N N represent two horizontal transverse brake-rods, having brake-shoes $p$ $p$ applied to them, which rods are suspended from the truck-frame $B'$, by links $s$, and acted upon by springs $i$ $i$, which keep the brake-shoes free from the wheels $A^3$, when power is not applied to stop or check the train.

To the bottom of the car-bed $A^1$, guides M M' are applied, through which rods $D^1$ $D^2$ receive longitudinal movements. These rods are arranged in the same line, and are moved forward and backward together. The rod $D^1$ projects beyond the front end of the bed $A^1$ far enough to abut against or to be acted upon by the rear end of one of the longitudinal beams of frame D, when this frame is forced backward. The rear end of the rod $D^1$ is pivoted to one end of a horizontal transverse lever, R, the opposite end of which is connected by a rod, $g$, to one end of another horizontal transverse lever, S, to the opposite end of which the rod $D^2$ is pivoted, as shown in figs. 2 and 3.

The levers and rods above described are arranged in the same horizontal plane, and when rod $D^1$ is forced backward, the rod $D^2$ will receive a similar movement, or *vice versa*.

The two levers R S are supposed to be arranged on opposite sides of the middle of the length of the car-bed $A^1$, and the rod $D^2$ is supposed to extend to and beyond the end of the car, which is opposite that shown in the drawings, precisely as described for the rod $D^1$, so as to operate a system of rods, levers, connecting-rods, and brakes, similar to those shown, which are applied upon the succeeding car in the train, and these contrivances will actuate others upon the next car, and so on, throughout any number of cars in a train.

On opposite sides of the fulcrum of the lever R, and at equal distances from this fulcrum, chains $h\ h'$ are fastened to it, which are carried forward and fastened to the upper end of a lever, J, as shown in figs. 2 and 3. The lever J is pivoted to the front brake-rod N, and the lower end or short arm of this lever is connected, by a centrally-arranged rod or link, I, to the rear brake-lever N, as shown.

Each truck throughout a train of cars is provided with an arrangement similar to that above described, so that all the brakes of a train will be applied to the wheels, by the backward movement of the frame D, said brakes being released by the action of the springs $i$, or their equivalents, when the frame D is allowed to move forward.

It will be seen from the above description that, whichever direction the rods $D^1 D^2$ be moved, one or the other of chains $h\ h'$ will cause the brakes to be applied to their respective wheels, thus allowing either end of a car to be coupled to the tender, or to another car.

As the rods $D^1 D^2$ are arranged in the same line on one side of the bed A, it is necessary to construct the frame D with two thrusting ends, substantially as shown, so as to allow this frame to operate the brakes, whichever end of a car be coupled to the tender.

In carrying out our invention, we shall provide for adjusting the parts according to the slack of a train, caused by extended or shortened coupling-links, so as to keep the brakes in proper working order.

We are aware that it is not new to operate car-brakes throughout a train of cars, by means of rods which abut against one another, when the power of the brakeman, or other power, is applied to a windlass or lever; but we are not aware that a frame, such as we have described, has been applied to the tender of a locomotive, when constructed and operated as we have set forth; nor are we aware that the intermediate levers, rods, and chains have been arranged in the simple, practical manner, so as to operate in combination with such a frame, whether, or not, either end of a car be coupled to another car, as we have shown.

What we claim as new, and as our invention, and desire to secure by Letters Patent, is—

1. The arrangement of the rod $D^2$, links S R $g$, chain $h\ h'$, rocking bar J, brake-bars N, suitable connections and rod $D^1$, substantially in the manner and for the purpose described.

2. The arrangement of the chain or cord $b$ and brake-shaft $a$, in combination with the sliding self-retracting frame D D, in the manner shown and described.

3. The rods $D^1 D^2$, arranged on opposite ends of a car, and connected to the brake-bars as described and shown, in combination with the right and left arms of the sliding self-retracting frame D D, substantially as and for the purpose described.

WARREN PORTLOCK.
J. R. DODDS.

Witnesses:
JOHN THOMPSON,
HIRAM ALLEN.